United States Patent
Hauske et al.

(10) Patent No.: US 10,989,307 B2
(45) Date of Patent: Apr. 27, 2021

(54) MONITORING SLIDE RING SEAL

(71) Applicants: KSB SE & Co. KGaA, Frankenthal (DE); Bestsens AG, Coburg (DE)

(72) Inventors: Maximilian Hauske, Mannheim (DE); Tina Weinberger, Stutensee (DE); Christoph Brueckner, Coburg (DE); Jurij Root, Coburg (DE); Stefan Schneider, Coburg (DE); Imannuel Rossteutscher, Coburg (DE)

(73) Assignees: KSB SE & Co. KGaA, Frankenthal (DE); Bestsens AG, Coburg (DE)

( * ) Notice: Subject to any disclaimer, the term of this patent is extended or adjusted under 35 U.S.C. 154(b) by 145 days.

(21) Appl. No.: 16/064,646

(22) PCT Filed: Dec. 19, 2016

(86) PCT No.: PCT/EP2016/081726
§ 371 (c)(1),
(2) Date: Jun. 21, 2018

(87) PCT Pub. No.: WO2017/108680
PCT Pub. Date: Jun. 29, 2017

(65) Prior Publication Data
US 2018/0372226 A1    Dec. 27, 2018

(30) Foreign Application Priority Data
Dec. 21, 2015   (DE) .................... 10 2015 226 311.8

(51) Int. Cl.
*G01N 29/04*    (2006.01)
*F16J 15/34*    (2006.01)
(Continued)

(52) U.S. Cl.
CPC ........ *F16J 15/3492* (2013.01); *G01N 29/041* (2013.01); *G01N 29/28* (2013.01); *G01N 29/348* (2013.01); *G01N 2291/2696* (2013.01)

(58) Field of Classification Search
CPC .. G01N 29/041; G01N 29/043; G01N 29/045; F16J 15/3492
(Continued)

(56) References Cited

U.S. PATENT DOCUMENTS

| | | | |
|---|---|---|---|
| 6,019,000 A | 2/2000 | Stanke et al. | |
| 6,360,610 B1 * | 3/2002 | Jarzynski | G01N 29/11 73/32 A |

(Continued)

FOREIGN PATENT DOCUMENTS

| | | |
|---|---|---|
| DE | 197 25 012 C1 | 11/1998 |
| EP | 2 362 122 A2 | 8/2011 |

(Continued)

OTHER PUBLICATIONS

International Preliminary Report on Patentability (PCT/IB/338 & PCT/IB/373) issued in PCT Application No. PCT/EP2016/081726 dated Jul. 5, 2018, including English translation of document (German-language Written Opinion (PCT/ISA/237)) previously filed on Jun. 21, 2018 (six pages).

(Continued)

*Primary Examiner* — Tarun Sinha
(74) *Attorney, Agent, or Firm* — Crowell & Moring LLP (57) ABSTRACT

An arrangement for shaft sealing and to a method for monitoring the sealing of the shaft seal are provided. The arrangement includes a rotating slide ring and a stationary slide ring, with a sealing gap having a lubricating film therebetween. The arrangement includes at least one sound transducer for generating and/or receiving exciting sound waves in the form of Lamb Rayleigh waves in at least one
(Continued)

slide ring. The signals of the sound transducer are evaluated by an evaluation unit to determine the condition of the lubricating film in the gap.

21 Claims, 6 Drawing Sheets

(51) Int. Cl.
*G01N 29/28* (2006.01)
*G01N 29/34* (2006.01)

(58) Field of Classification Search
USPC .......................................................... 73/644
See application file for complete search history.

(56) References Cited

U.S. PATENT DOCUMENTS

| | | | |
|---|---|---|---|
| 2009/0049916 A1* | 2/2009 | Sargent | G01N 29/041 73/588 |
| 2010/0106429 A1 | 4/2010 | Horak | |
| 2012/0067111 A1 | 3/2012 | Lindner et al. | |
| 2016/0003780 A1 | 1/2016 | Altpeter et al. | |

FOREIGN PATENT DOCUMENTS

| | | |
|---|---|---|
| JP | 59-180456 A | 10/1984 |
| JP | 62-173151 A | 7/1987 |
| JP | 8-261997 A | 10/1996 |
| JP | 2013-538353 A | 10/2013 |
| NL | 1020811 C2 | 12/2003 |
| WO | WO 01/33208 A1 | 5/2001 |
| WO | WO 2008/089800 A1 | 7/2008 |
| WO | WO 2010/142367 A1 | 12/2010 |
| WO | WO 2014/131499 A1 | 9/2014 |

OTHER PUBLICATIONS

International Search Report (PCT/ISA/210) issued in PCT Application No. PCT/EP2016/081726 dated Feb. 16, 2017 with English translation (six (6) pages).

German-language Written Opinion (PCT/ISA/237) issued in PCT Application No. PCT/EP2016/081726 dated Feb. 16, 2017 (five (5) pages).

German-language Search Report issued in counterpart German Application No. 102015226311.8 dated Sep. 1, 2016 with partial English translation (thirteen (13) pages).

English Translation of Japanese-language Office Action issued in Japanese Application No. 2018-532248 dated Aug. 13, 2020 (four (4) pages).

\* cited by examiner

MONITORING SLIDE RING SEAL

CROSS REFERENCE TO RELATED APPLICATIONS

This application is a National Phase Application of PCT International Application No. PCT/EP2016/081726, filed Dec. 19, 2014, which claims priority under 35 U.S.C. § 119 from German Patent Application No. 10 2015 226 311.8, filed Dec. 21, 2015, the entire disclosures of which are herein expressly incorporated by reference.

BACKGROUND AND SUMMARY OF THE INVENTION

The invention relates to an arrangement for shaft sealing having a rotating slide ring and a stationary slide ring between which a sealing gap for a lubricating film is arranged and having at least one sound transducer for exciting sound waves in and/or on at least one slide ring, wherein the arrangement has a unit for evaluating signals of the sound transducer.

A shaft seal is a seal which seals a centrifugal pump at the lead-through of the rotating pump shaft from the fixed pump casing so that the leakage loss via the air penetrating from the outside is reduced to a minimum amount and any wear of the sealing faces is as low as possible.

Mechanical seals have a sealing gap which is at a right angle to the shaft axis. Shaft seals of this type are also known as axial or hydrodynamic mechanical seals (GLRD). Such mechanical seals require less space and lower maintenance than other sealing systems.

Mechanical seals have proven effective in situations where the pressures and circumferential velocities under which sealing is to take place are both low and high.

During operation, two sealing faces slide against one another, which sealing faces are pressed against one another by hydraulic and mechanical forces. The sealing gap with a generally liquid lubricating film is located between these two precision machined slide faces.

The very small amount of leakage in the case of mechanical seals enters the atmosphere as vapor leakage and dry leakage.

Dry running is one of the fundamental causes of failure of mechanical seals, in particular in the case of mechanical seals for centrifugal pumps. Owing to an increase in temperature at the slide faces, the evaporation temperature of the lubricating film is exceeded, which results in evaporation of the lubricating film and local dry running. As a result of the increased wear and the frictional heat produced, the seal fails thermally. This can result in the slide rings breaking down. In addition to the loss of the sealing effect, it is also detrimental for any splinters to make their way into the fluid against which sealing is provided.

EP 2 362 122 A2 describes a mechanical seal in which a delivery device for delivering the lubricating fluid is integrated. Sensors in or near to the sealing gap detect operating parameters of the mechanical seal.

WO 2010/142367 A1 describes a mechanical seal with a friction monitoring device. This serves for monitoring the operating state of the mechanical seal. The monitoring device comprises a bar with a sensor element for detecting a bending of the bar. The bar is arranged in a recess in the stationary slide ring.

WO 2008/089800 A1 describes a mechanical seal which comprises a monitoring device with a force measuring device. The force measuring device detects the instantaneous anti-rotation forces and generates an output signal representing this. The force measuring device can be connected directly to the rotationally fixed slide ring by a force transmitting element.

U.S. Pat. No. 6,360,610 B1 describes a mechanical seal with point-to-point contact detection between a transmitter and a receiver. In this case, a shear wave (transverse wave) is generated by the transmitter. A transducer generates an ultrasound shear wave at the interface between a fixed face and the rotating face. During normal operation, the ultrasound shear wave is primarily reflected by the interface. A first transducer generates an ultrasound shear wave which is detected by a second transducer after it passes through an interface of the fixed face and the rotating face. The second transducer identifies a measurably stronger ultrasound shear wave when the liquid film in the interface breaks down.

The object of the invention is to specify an arrangement for shaft sealing which operates reliably and is protected against dry running. In this case, a method shall be used for monitoring a mechanical seal, which identifies possible wear and the occurrence of damage during operation without thereby disturbing or significantly impairing the operation. The arrangement shall moreover be notable for a construction which is as economical as possible and for a long service life.

According to the invention, the sound transducer is designed for generating and/or receiving Lamb-Rayleigh waves. In contrast to the conventional application of transverse waves or shear weaves, which are used in arrangements according to the prior art, Lamb-Rayleigh waves enable complete monitoring of the gap zone of the lubricating film over the entire area. According to the invention, the Lamb-Rayleigh waves move in a guided manner along a circular path which is realized by the slide ring.

The Lamb-Rayleigh waves propagate in the slide ring. In this case, the propagation preferably takes place in surface layers of the slide ring. This therefore refers to surface waves. It has been shown to be particularly favorable if the sound transducers are designed for sound waves to propagate in the surface layers of the slide ring material both on the surface of the slide ring into which the sound waves are fed and on an opposing surface which is in contact with the lubricating film.

In conventional arrangements, only point-to-point detection takes place since transverse waves are generated which only propagate linearly.

It has now been surprisingly established that the generation and detection of Lamb-Rayleigh waves effects a propagation of the sound waves along the entire circumference of the slide ring, and the entire sealing gap, and therefore the entire lubricating film, can thus be monitored.

Reliable identification of a dry running of the mechanical seal is thus ensured. This therefore constitutes very efficient leakage monitoring. Wear or damage to the mechanical seal can also be detected early and reliably. This is the basis for predictive maintenance.

As a result of the inventive all-round monitoring of the sealing gap, statements relating to imbalances of the shaft, for example due to incorrect alignments, are moreover possible. It is also possible to determine the rotational speed.

The arrangement according to the invention enables early detection of gradual deterioration and the prediction of any possible risk of failure.

In a particularly favorable embodiment of the invention, the sound transducer is designed for generating or receiving sound waves whereof the wavelengths correspond approximately to the width of a slide ring. A Lamb-Rayleigh wave is thus produced both at the front end face of the slide ring, into which the acoustic waves are coupled, and also at the rear end face of the slide ring towards the lubricating film.

It has proven favorable if the ratio of the wavelength to the width of the slide ring is $$\frac{\lambda}{b} < 100,$$

preferably $$\frac{\lambda}{b} < 10,$$

in particular $$\frac{\lambda}{b} < 5.$$

It has been surprisingly established that Lamb-Rayleigh waves also form in slide rings if the ratio of the wavelength to the width of the slide ring is $$\frac{\lambda}{b} < 0.01,$$

preferably $$\frac{\lambda}{b} > 0.1,$$

in particular $$\frac{\lambda}{b} > 0.2.$$

According to the invention, at least one sound transducer generates acoustic surface waves which are formed as Lamb-Rayleigh waves. The Lamb-Rayleigh waves propagate in at least one slide ring, which has a delimited width. They are produced by the superposition of a longitudinal and a transverse wave.

Thus, various propagable modes are produced in the slide ring, whereof the velocity depends on the product of the frequency and the slide-ring width.

Since an end face of the slide ring is in contact with the lubricating film, some of the wave energy passes over into the lubricating film.

Waves which propagate along the circumference of a slide ring are preferably coupled into the slide ring by a sound transducer. Thus, in contrast to conventional arrangements according to the prior art, a point-to-point contact detection between the transmitter and receiver does not take place, but rather a complete monitoring of the gap zone of the lubricating film over the entire area.

In a particularly favorable variant of the invention, at least two sound transducers are used. These are preferably arranged offset through an angle on the slide ring. In this case, it has proven advantageous if the sound transducers are arranged at an end face of a slide ring, wherein the angular offset between the two transducers is preferably greater than 30°, in particular greater than 60°.

In this case, one sound transducer serves as a transmitter and the other as a receiver. Alternatively, a plurality of transmitters and/or receivers can also be used. A transducer can also be operated both as a transmitter and as a receiver.

As a result of the inventive configuration of the acoustic surface waves, Lamb-Rayleigh waves can propagate on both sides of the slide ring. The sound transducers can therefore be mounted on the outer faces of the rotating and/or stationary slide ring. This creates favorable installation conditions for the sound transducers at the outer faces.

It has proven particularly favorable if at least one sound transducer is mounted at an outer edge of the rotating slide ring and/or stationary slide ring. It has thus been surprisingly established that this results in particularly precise measurements.

In a particularly favorable embodiment of the invention, the sound transducer and the coupling point of the slide ring are not in planar contact. To this end, the sound transducer can have a rounded design and/or an end face of the slide ring can be provided with a rounded portion for coupling and/or decoupling sound waves. Such rounded portions have surprisingly proven to be considerably more favorable than two planar faces since they result in a defined acoustic coupling.

Both the transmitter and the receiver can be designed with a rounded portion. Alternatively, it is also possible for only one of the two to be designed with a rounded portion.

Additionally or alternatively, the sound transducer and/or an end face of a slide ring can have a projection for coupling or decoupling sound waves. A sound transducer and/or an end face of a slide ring can also have a chamfered portion for coupling or decoupling sound waves.

Further features and advantages of the invention are revealed in the description of exemplary embodiments with reference to drawings and in the drawings themselves.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5b shows a view of an end face of a slide ring according to the illustration of FIG. 5a;

DETAILED DESCRIPTION

Figure 1:
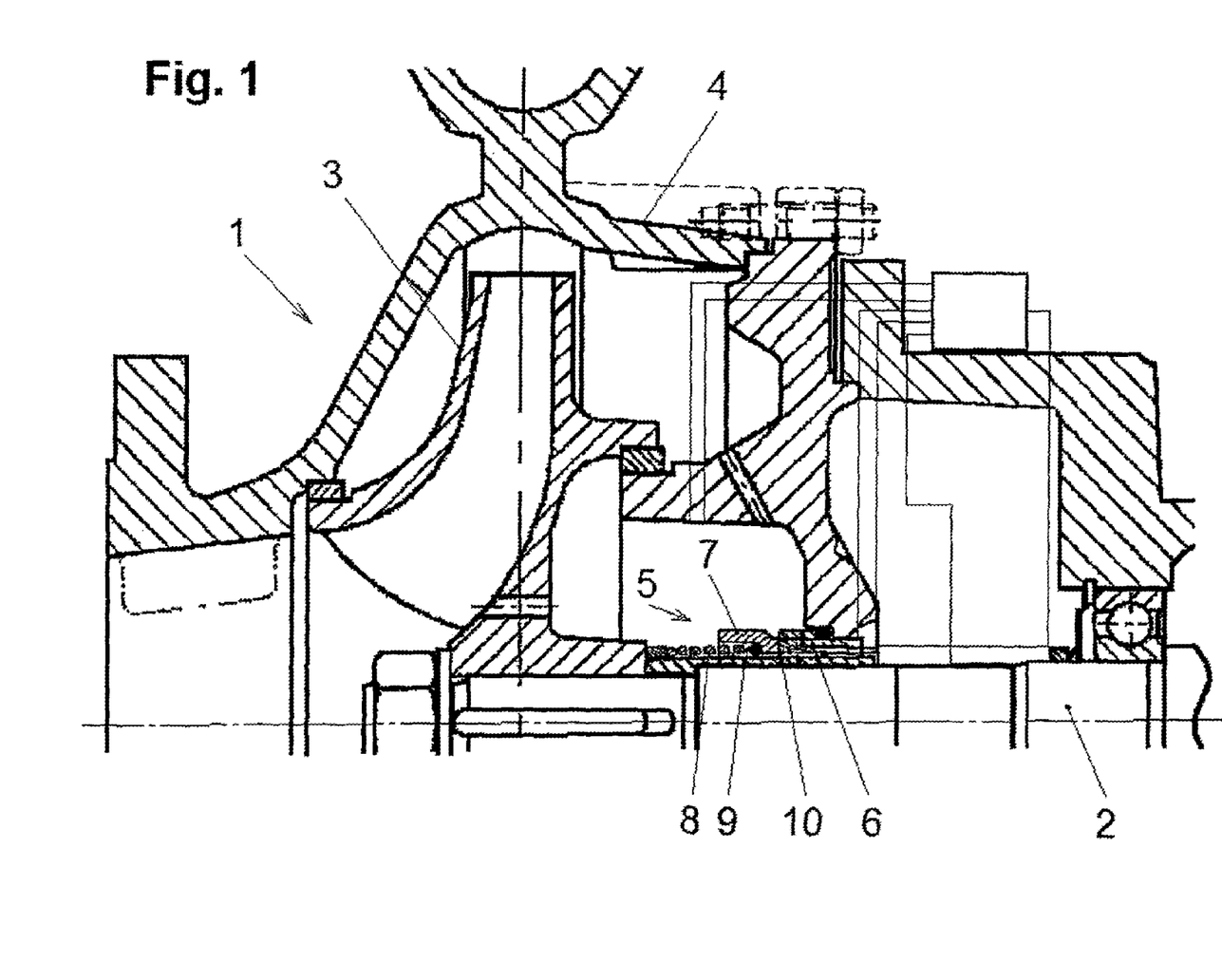
FIG. 1 shows a centrifugal pump with an arrangement for shaft sealing.

FIG. 1 shows a centrifugal pump 1 with a rotating shaft 2, an impeller 3 and a fixed casing 4. A mechanical seal 5 has a first axially fixed slide ring 6 and a second axially movable slide ring 7. The axially movable slide ring 7 is pressed in the direction of the first slide ring 6 by a prestressing element 8, here a pressure spring, and via a pressure ring 9, so that mutually opposing faces of the first and second slide ring 6, 7 cooperate in a sealing manner and form a sealing gap 10 between them. The first slide ring 6 is arranged stationary in the casing 4. The spring-loaded slide ring 7 is connected to the shaft 2 of the centrifugal pump 1 in a rotationally fixed manner.

Figure 2:
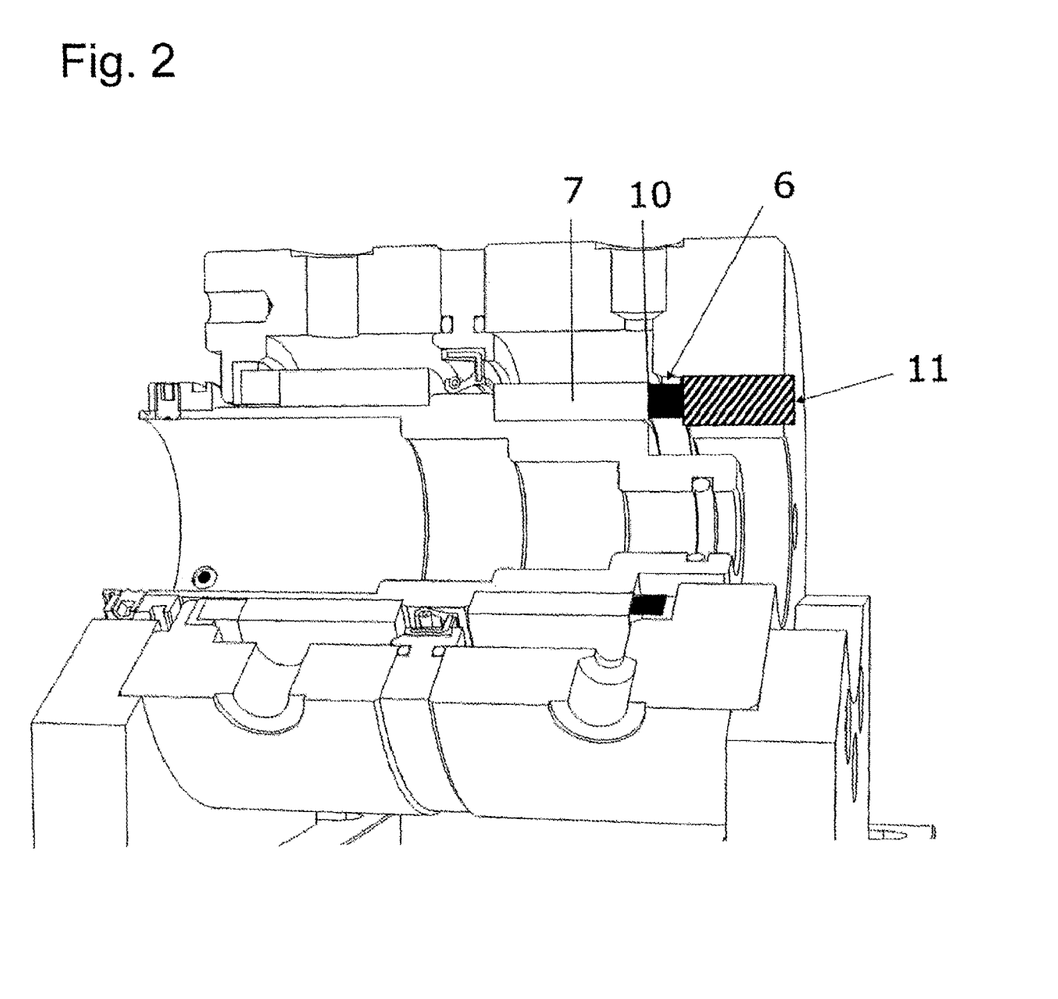
FIG. 2 shows a perspective sectional illustration of a mechanical seal arrangement in accordance with an embodiment of the present invention.

FIG. 2 shows, as a perspective sectional illustration, a variant installation of a mechanical seal arrangement with a sound transducer 11 which is arranged in the dry region. The sound transducer 11 couples acoustic surface waves into an end face of a stationary slide ring 6. At the opposing end face of the stationary slide ring 6, the sealing gap is located between the stationary slide ring 6 and the movable slide ring 7. The sealing gap 10 is filled with a lubricating film.

Figure 3:
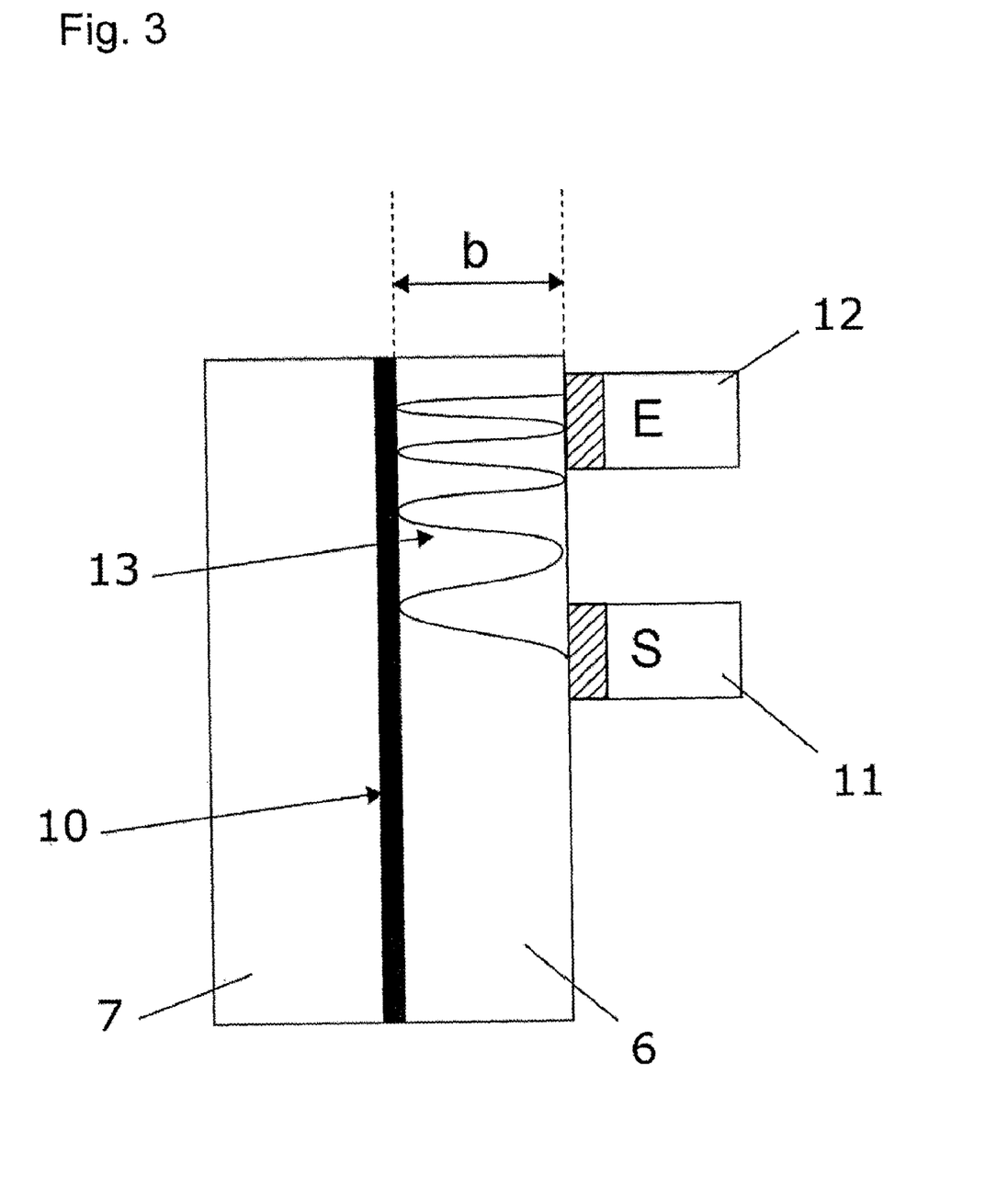
FIG. 3 shows a schematic illustration of a transmitter and receiver mounted on a mechanical seal in accordance with an embodiment of the present invention.

FIG. 3 shows a schematic illustration with a first sound transducer 11, which is designed as a transmitter, and a second sound transducer 12, which is designed as a receiver. Both the transmitter 11 and the receiver 12 are arranged at the end face of a stationary slide ring 6. According to the invention, the transmitter 11 generates an acoustic surface wave which is formed as a Lamb-Rayleigh wave.

The stationary slide ring 6 has a delimited width b. According to the invention, the wavelength of the acoustic surface wave which is coupled in the stationary slide ring 6 corresponds approximately to the width b of the slide ring, preferably with a deviation of +/−30%, in particular with a deviation of +/−10%. The Lamb wave is thus for the superposition of two Rayleigh waves, one at the front end face of the slide ring 6 and one at the rear end face of the slide ring 6.

Various propagable modes, whereof the velocity depends on the product of the frequency and the slide-ring width, are thus produced in the slide ring 6. The opposing end face of the slide ring 6 (as seen on the left in the drawing) is in contact with the sealing gap 10 which is filled with a lubricating film. Some of the wave energy passes over into the lubricating film. In the arrangement for shaft sealing, a slide ring 6 serves as a propagating substrate. The Lamb-Rayleigh waves are generated on this by the transmitter 11. These propagate at the surfaces and are received again by the receiver 12.

During the transmission of the acoustic signal, it is influenced by the acoustic properties of the substrate. If the viscous liquid layer of the surface is altered by the entrained lubricating film, these effects are reflected in a modulated propagation velocity and damping of the surface wave, which in turn has an influence on the measurements of the reception amplitude and wave travel time. From the transmitted and received signals, it is possible, by signal analysis, to draw conclusions relating to the thickness of the lubricating gap or the consistency of the lubricating film. Problems, such as possible dry running or partial lubrication, can thus be detected early. This is the basis for predictive maintenance. At least one slide ring 6, 7 preferably consists of a silicon carbide material (SiC—SiC). However, in principle, other materials are also possible, for example carbon. The "softer" the material, the greater the damping of the Lamb-Rayleigh wave on the transmission path. Both a piezoelectric material and a non-piezoelectric material are possible propagation media for Lamb-Rayleigh waves.

The evaluation of the signals takes place via a unit which is preferably designed as a control and/or evaluating unit. In this case, a primary evaluation in the time domain has proven advantageous, wherein amplitude, travel time, energy, shape of the signal, contour are analyzed in particular.

The propagation velocity of the Lamb-Rayleigh waves generated according to the invention is dependent on the width of the sealing gap 10. In principle, this therefore enables a continuous statement relating to the quality of the state of the sealing gap 10. With conventional transverse waves, as are used in the prior art, only a binary yes/no statement would be possible. Therefore, this only enables a statement as to whether or not the sealing gap 10 is filled with a lubricating film. The reason for this is that a transverse wave cannot penetrate into the lubricating film.

Figure 4:
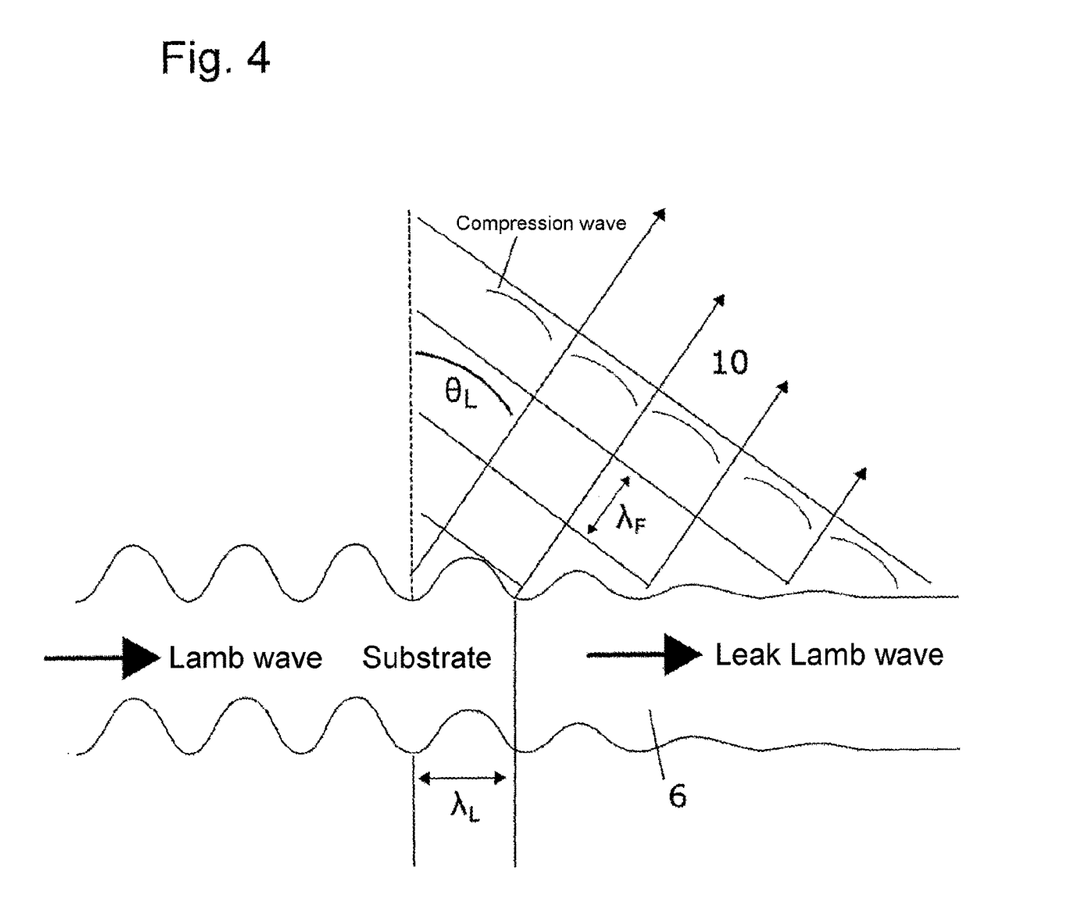
FIG. 4 shows a schematic illustration of a mode conversion of a Lamb wave.

FIG. 4 again clearly shows the propagation of a Lamb-Rayleigh wave. The Lamb-Rayleigh wave interacts with the lubricating film of the sealing gap 10 which, as seen in the illustration according to FIG. 4, is arranged above the slide ring 6, wherein the slide ring 6 forms the substrate for the propagation of the Lamb-Rayleigh wave.

Figure 5A:
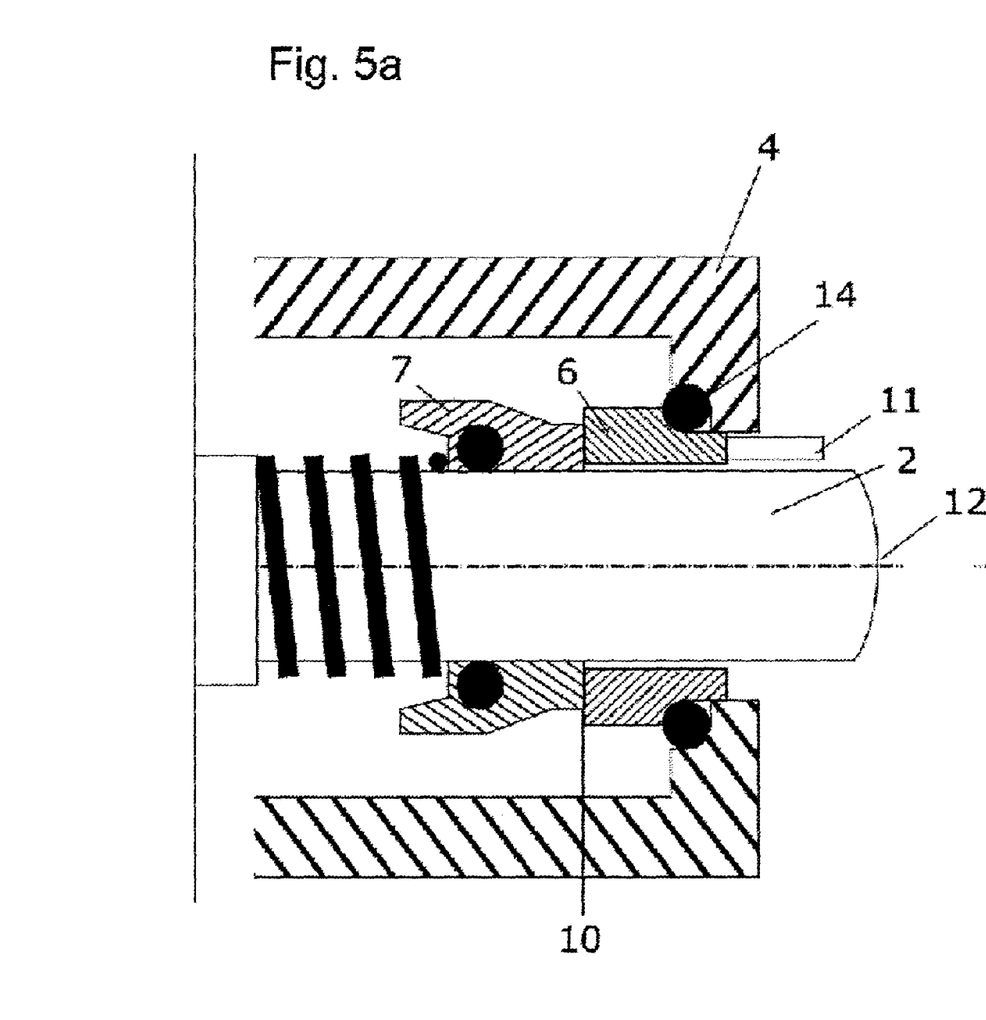
FIG. 5a shows a schematic illustration (partly as a section) of a mechanical seal arrangement in accordance with an embodiment of the present invention.
Figure 5B:
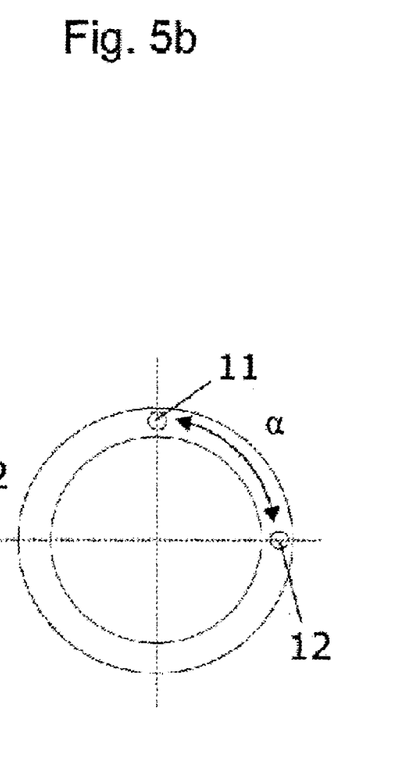

FIG. 5a shows an illustration, partly as a sectional illustration, with a stationary slide ring 6 and an axially displaceable slide ring 7. A transmitter 11 and a receiver 12 are arranged at an end face in the dry region of the stationary slide ring 6. In FIG. 5b, it can be seen that the transmitter 11 and receiver 12 are arranged at the end face of the slide ring 6 such that they are offset from one another along the circumference through an angle α. The angle α can be between 1 and 180°. In the exemplary embodiment according to the illustration in FIG. 5b, the angle α is 90°.

The transmitter 11 generates a Lamb-Rayleigh wave, which propagates in both directions (flowing left and right) on both sides of the fixed ring 6 of the mechanical seal. The Lamb-Rayleigh wave interacts with the lubricating film in the sealing gap 10. Depending on the angular offset a between the transmitter 11 and receiver 12, the waves flowing right and left hit the receiver 12 at different points in time and can therefore be evaluated separately. From the signal properties of the received signal, it is possible to draw conclusions relating to the state of the sealing gap 10 with the lubricating film. It is also possible to evaluate a plurality of flows of the waves. This results in an increase in the measuring effect and the evaluated range. Alternatively, a sound transducer 11, 12 can also serve simultaneously as a transmitter and receiver (multiplexes).

The illustration according to FIG. 5a shows that both the fixed slide ring 6 and the axially displaceable slide ring 7 are not designed as purely hollow cylindrical bodies Therefore, the fixed slide ring 6 has, for example, a first portion, the right portion as seen in the figure, which has a smaller outer diameter than the left portion as seen in the figure. This projection serves for securing a sealing element 14 between the slide ring 6 and the fixed casing 4. This sealing element 14 is designed as an O ring in the exemplary embodiment.

Such an offset as formed in an axially fixed slide ring 6 or axially movable slide ring 7 in FIG. 5a can present difficulties during the propagation of the acoustic surface waves.

Figure 6:
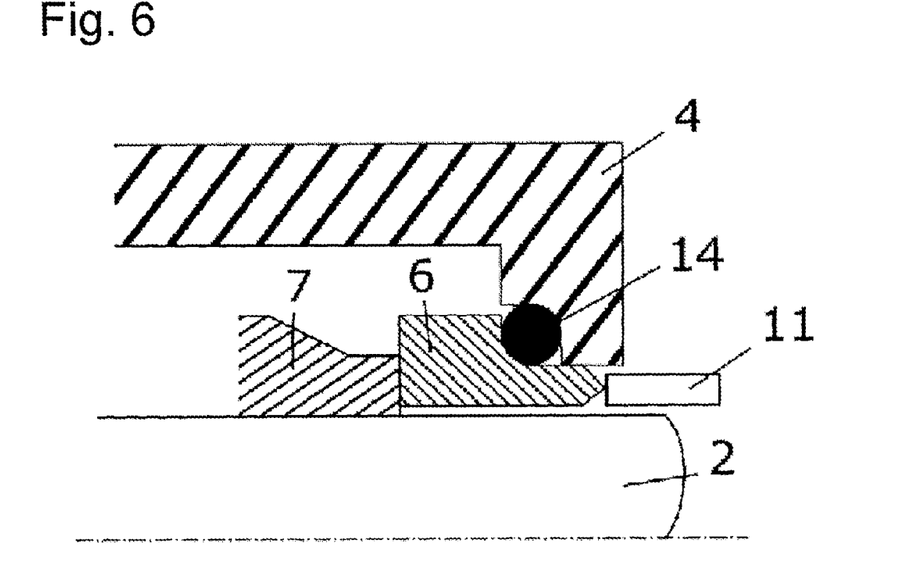
FIG. 6 shows a slide ring with an end face which has a projection in accordance with an embodiment of the present invention.

FIG. 6 shows a variant in which an end face of the slide ring 6, the right end face as seen in the drawing, has a projection so that the transmitter 11 and/or the receiver 12 are not coupled to the slide ring in a planar manner, but only along a line of the projection.

Figure 7:
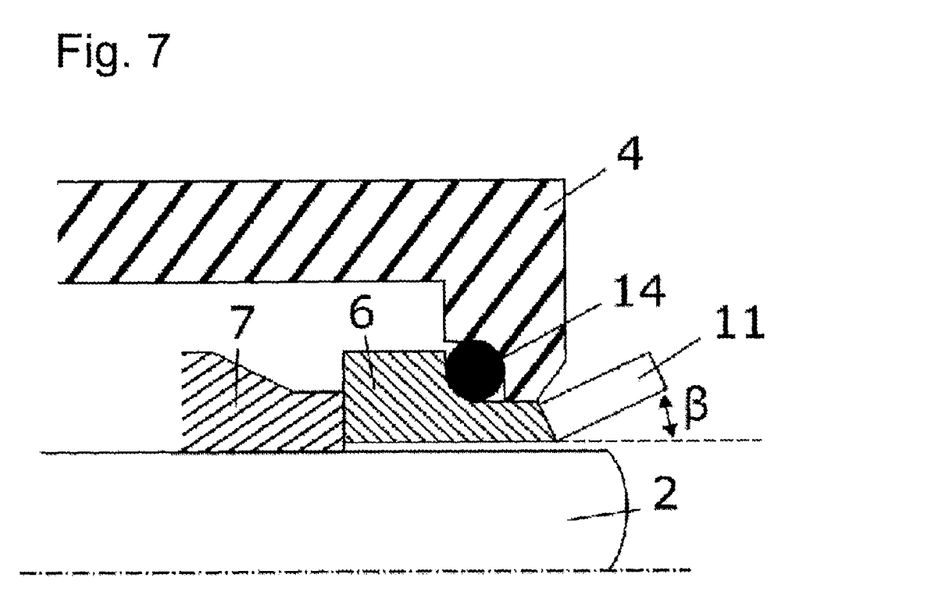
FIG. 7 shows a slide ring which has a chamfered portion in accordance with an embodiment of the present invention.

FIG. 7 shows a variant for enabling a solution to the problem of an offset present in the case of the slide ring 6. Even though the slide ring 6 has an offset, favorable propagation of the acoustic surface wave is possible with this construction. In this variant, an end face of the slide ring 6 is chamfered so that coupling into the slide ring 6 is not effected purely in the axial direction but at an angle β.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An arrangement for shaft sealing, comprising:
a rotating slide ring;
a stationary slide ring;
at least one sound transducer; and
an evaluation unit,
wherein
the rotating slide ring and the stationary slide ring are coaxially arranged with a sealing gap for a lubricating film therebetween,
the at least one sound transducer is arranged to at least one of generate and receive exciting sound waves in the form of Lamb-Rayleigh waves at least one of in and on at least one of the slide rings,
the evaluation unit is configured to evaluate signals generated in response to the exciting sound waves received at the at least one sound transducer and generate an output corresponding to a condition of the lubricating film in the sealing gap,
the at least one sound transducer is configured to at least one of generate and receive waves propagating along a circumference of the one of the slide rings,
one of the at least two sound transducers is arranged at the end face of the one of the slide rings, and
an end face of at least one of the slide rings has a projection configured to cooperate with the at least one sound transducer for the at least one of coupling and decoupling the sound waves.

2. The arrangement as claimed in claim 1, wherein the at least one sound transducer is configured to at least one of generate and receive the sound waves as acoustic surface waves having a ratio of wavelength to a width of one of the slide rings on which the surface waves are propagating of less than 100.

3. The arrangement as claimed in claim 2, wherein the ratio of wavelength to width is less than 5.

4. The arrangement as claimed in claim 2, wherein the at least one sound transducer is configured to at least one of generate and receive the acoustic surface waves with the ratio of wavelength to of greater than 0.01.

5. The arrangement as claimed in claim 4, wherein the ratio of wavelength to width greater than 0.2.

6. The arrangement as claimed in claim 4, wherein the at least one sound transducer is configured to at least one of generate and receive waves propagating at at least one of a front end face and a rear end face of the one of the slide rings.

7. The arrangement as claimed in claim 6, wherein the at least one sound transducer includes at least two sound transducers arranged offset through an angle on the one of the slide rings, and
the angle is greater than 30°.

8. The arrangement as claimed in claim 7, wherein the angle is greater than 60°.

9. The arrangement as claimed in claim 1, wherein the one of the at least two sound transducers arranged at the end face of the one of the slide rings and a coupling point of the slide rings are not in planar contact.

10. The arrangement as claimed in claim 9, wherein the one of the at least two sound transducers arranged at the end face of the one of the slide rings has a rounded portion for at least one of coupling and decoupling the sound waves.

11. The arrangement as claimed in claim 10, wherein the one of the at least two sound transducers arranged at the end face of the one of the slide rings has a projection for the at least one of coupling and decoupling the sound waves.

12. The arrangement as claimed in claim 1, wherein the end face of the one of the slide rings has a rounded portion configured to cooperate with the one of the at least two sound transducers for the at last one of coupling and decoupling the sound waves.

13. The arrangement as claimed in claim 12, wherein at least one of the one of the at least two sound transducers and the end face of the one of the slide rings has a chamfered portion configured to cooperate with the other for the at least one of coupling and decoupling the sound waves.

14. The arrangement as claimed in claim 13, wherein the one of the at least two sound transducer is arranged at an outer edge of the one of the slide rings.

15. A method for monitoring a mechanical seal, comprising the acts of:
providing at least one rotating slide ring coaxially with at least one stationary slide with a lubricating film gap therebetween and at least one sound transducer;
generating Lamb-Rayleigh waves with the at least one sound transducer at least one of in and on at least one of the slide rings;
receiving sound waves resulting from the generation of the Lamb-Rayleigh waves at the at least sound transducer; and
determining using an evaluation unit a condition of the lubricating film based on the received sound waves,
wherein
the at least one sound transducer is configured to at least one of generate and receive waves propagating along a circumference of the one of the slide rings,
one of the at least two sound transducers is arranged at the end face of the one of the slide rings, and
an end face of at least one of the slide rings has a projection configured to cooperate with the at least one sound transducer for the at least one of coupling and decoupling the sound waves.

16. The method as claimed in claim 15, wherein the received sound waves include sound waves propagating along a circumference of at least one of the slide rings.

17. The method as claimed in claim 16, wherein the Lamb-Rayleigh waves have a ratio of wavelength to a width the at least one of the slide rings of less than 100.

18. The method as claimed in claim 17, wherein the ratio is less than 5.

19. The method as claimed in claim 18, wherein the ratio is greater than 0.01.

20. The arrangement as claimed in claim 18, wherein the ratio of is greater than 0.2.

21. The method as claimed in claim 20, wherein the waves propagate at at least one of a front end face and a rear end face of the one of the slide rings.

* * * * *